UNITED STATES PATENT OFFICE.

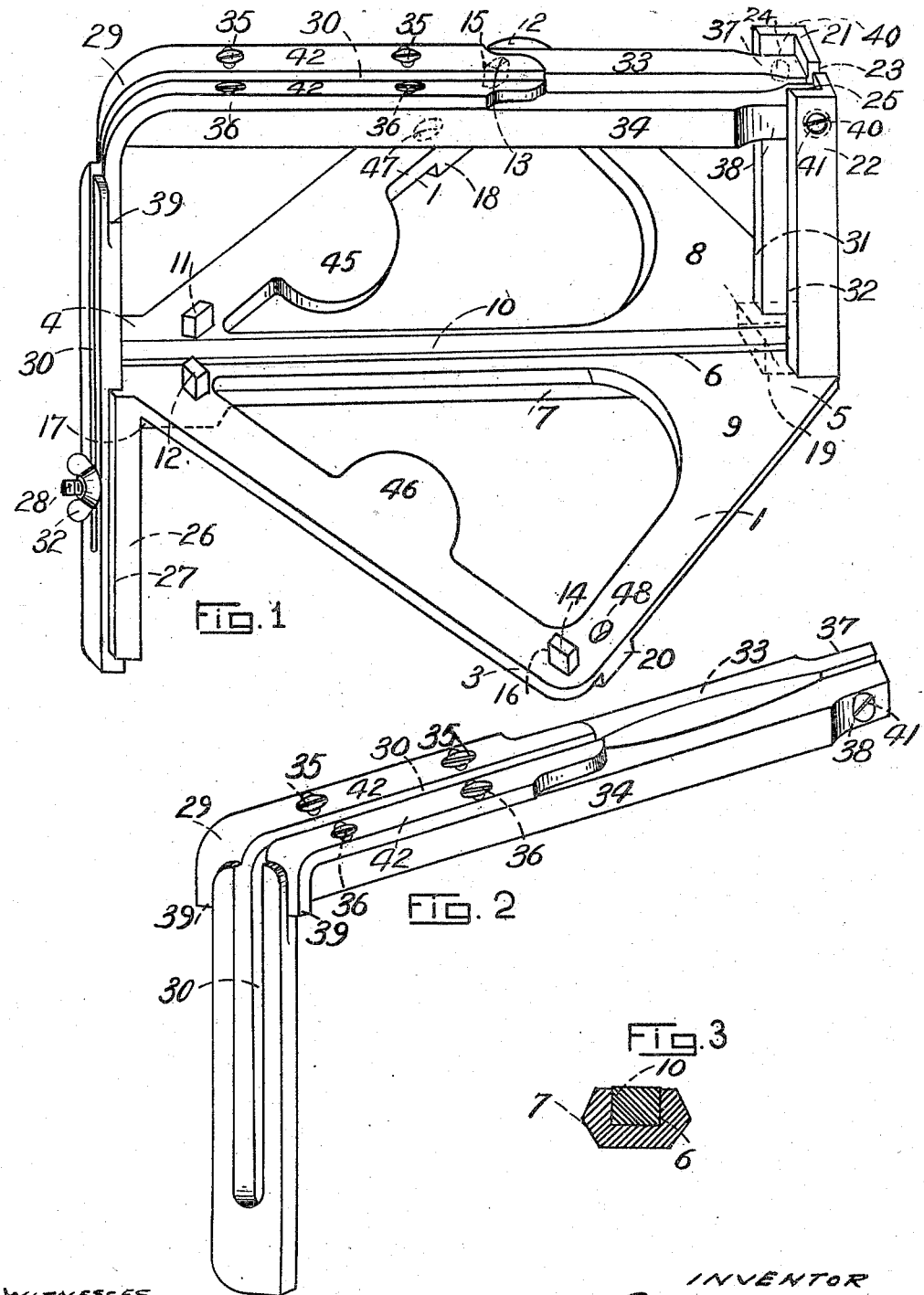

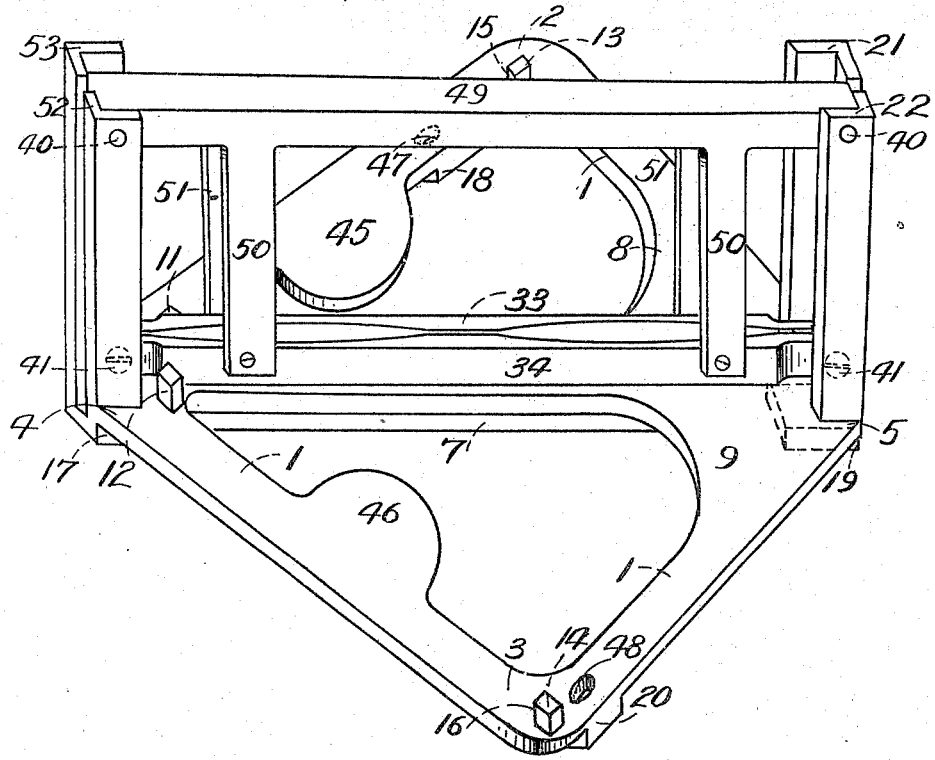
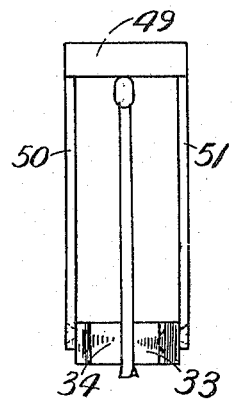

RALPH DUNNE, OF DUNEDIN, NEW ZEALAND.

MITER-BOX.

957,871. Specification of Letters Patent. Patented May 17, 1910.

Application filed December 2, 1907. Serial No. 404,762.

*To all whom it may concern:*

Be it known that I, RALPH DUNNE, of Dunedin, New Zealand, picture-framer, have invented certain new and useful Improvements in Miter-Boxes, of which the following is a specification.

The object of this invention is to provide a cheap and accurate mitering device adjustable for different thicknesses of material, that will not get out of order, and is easily manipulated.

In miter cutting devices of the wooden box channel type, the saw works in the wood which becomes cut and worn by reason of the lateral play of the saw teeth in the wood. This lateral play is due to the distance that the saw teeth work from the metallic guides usually placed on the top of the edge of the box. Telescopic or sliding saw guides have been used but they are expensive and frequently require a special bench.

In my invention the leading feature is the adjustable saw guide arrangement. Subsidiary features are the use of two pins or pillars for each fence instead of a continuous fence, a wooden saw teeth preserver, the construction of the device whereby it is rapidly set on and secured to a bench and the means for cutting strips at right angles prior to being mitered. The general design is such that the whole of the main parts of the device can be cast, or stamped out requiring only slight finishing and the boring of a few holes to make it ready for use.

The invention consists of these features and in the features and combination and arrangement of parts hereinafter described with reference to the accompanying drawings and more particularly pointed out in the claims.

In the drawings:—Figure 1 is a perspective view of the device. Fig. 2 is a perspective view of the saw guide. Fig. 3 is a cross section of the diagonal part showing the wooden saw teeth protector. Fig. 4 illustrates a modification of the device. Fig. 5 is an end view of the saw guide with one of the upright guides removed and showing a saw in position.

The body of the device consists preferably of a substantially diamond shaped portion (1) with two opposite corners (2) (3) preferably rounded and the two other opposite corners (4) (5) preferably flattened. A deep groove (6) is left in the diagonal part (7) of the body which lies in the line bisecting the right angle hereinafter referred to and which runs from one flattened corner (4) to the other (5). This diagonal part (7) forms a rest for the strips to be cut to lie on and it has lateral extensions (8) (9) upon which a strip is placed to be cut square as hereinafter described. In the groove (6) a strip of wood (10) is secured to preserve the saw teeth and prevent them from being damaged by contact with the bottom of the groove (6). Two pins (11) (12) which may be movable are placed on the body (1) one on each side of the groove (6) and two other pins (13) (14) formed integral with the body (1) are situated one near each of the rounded angles (2) (3) above described. If desired, one or more intermediate pins may be used. The angle formed between the two pins (11) (12) by the junction of the lines touching the inner corners of each pair of pins (13) (11) and (14) (12) is preferably a right angle. The pillars (13) (14) are so placed that a line touching their corresponding corners (15) (16) will cross at right angles the line bisecting the right angle formed between the two pins (11) (12) before described.

Feet (17) (18) (19) (20) are formed on the body (1) below each angle thereof so as to give a steady seat to the device when placed on a bench and of sufficient depth to admit the insertion of the fingers under the body in the act of holding thereon the strips to be cut. The angular pieces forming upright guides (21) (22) are formed integral with or are secured to the body (1) one on each side of the diagonal at the angle (5) opposite to the pins (11) (12). The vertical opening (23) left between them allows the free passage of a saw, and the sides (24) (25) of these angular pieces form guides for the narrowed ends (37) (38) of the horizontal wood pieces hereinafter described. The inner faces (31) (32) of these upright guides (21) (22) are so arranged that a line touching them will cross the diagonal or bisecting line at right angles. These upright guides are not necessary when the saw guide illustrated in Fig. 2 is used with shortened horizontal wood pieces. The body has a downward piece (26) behind the pins (11) (12) extending below and at right angles to it, and this piece (26) is also laterally at right angles to a vertical plane passing through the bisecting line before referred to. At one side of this piece (26) is a vertical rib (27) forming a guide for the vertical movement of the saw guide hereinafter described. There may be another such rib at the other side. About midway of the downward piece (26) and vertically below the end of the bisecting line is a screw (28) formed in the piece (26) for the wing nut (32) hereinafter described. The saw guide illustrated in Fig. 2 consists of a piece bent at right angles with rounded angle (29) and having a slot (30) throughout nearly its whole length. This slot (30) embraces the screw (28) before mentioned and the wing nut (32) before mentioned is used to jam the saw guide against the downward piece (26) see Fig. 1 so that the side or sides of the saw guide rest against the vertical rib (27) or ribs. The saw guide has square shoulders (39) to sit on top of the rib or ribs (27) when at its lowest point. A part (42) of the rectangular saw guide is for the purpose of projecting horizontally over and above the body (1). Strips preferably of wood (33) (34) are secured beneath this horizontal portion (42) one on each side of the slot (30) therein by two screws (35) (36) the holes in the part being made large or slotted for the screws (35) (36) so as to allow of lateral adjustment of the strips of wood (33) (34) for any thickness of saw and for alinement. These strips (33) (34) extend across the body so that their narrowed ends (37) (38) may be moved up and down in the upright angular guides (21) (22) before described when the saw guide is moved up and down. These ends (37) (38) are preferably narrowed so as to reduce the width of the upward angular pieces thereby allowing a wider strip to be placed on the body to be cut. Holes (40) are made in each of these upright angular guides (21) (22) at the side to permit of a screw driver reaching flat headed screws (41) larger than such holes which are inserted one in each side of each of the wooden strips. These screws (41) are for adjusting the strips (33) (34) in connection with the natural spring in the parts (42), laterally, so that the flat heads of the screws (41) may slide on the inner surfaces (24) (25) of the upright angular guides (21) (22) up and down with the saw guide. When the screws (41) are screwed inward the metal strips owing to their natural elasticity tend to open outward thus pressing the heads of the screws (41) so that these heads which lie on the inner surfaces of the guides 21, 22 may slide thereon.

The strip to be mitered is first cut square by being placed with its edge up against the inner surfaces of the pins (13) (14) or of the upright guides (21) (22) and the saw used as hereinafter described for mitering. The strip is then placed on the body with an end butting up against one of the pins (11) or (12) and with one of its edges lying against the two pins (12) (14) or (11) (13) which form the fence. The saw guide is brought down until the under surfaces of the wood strips (33) (34) touch the top of the strip to be cut and is clamped there by means of the wing nut (32). The saw is inserted between the strips (33) (34) and the strip is cut. The strip to be cut may be held by hand or by any suitable clamp, preferably semicircular portions (45) (46) being formed on the body therefor. When one of the pins (11) (12) is removed the strip need not be first cut square as it can be passed through to any desired measurement and cut where marked. Holes (47) (48) are made in the body for the purpose of receiving screws to fasten it to a board or bench.

In Fig. 3 is illustrated a modification of the device wherein there are upright angular guides such as (21) (22) Fig. 1 at the opposite corners (4) (5) the downward piece (26) and rib (27) being dispensed with. According to this form of the invention the saw guide consists of two strips of wood narrowed at both ends as previously described and fitted with screws for adjustment. A supporting frame having a horizontal piece (49) has hangers (50) (51) for the horizontal wood strips (33) (34) whose ends move up and down the upright angular guides (21) (22) (52) (53). The horizontal piece (49) rests on the back of the saw whose teeth project slightly below the wooden strips (33) (34). The strips thus descend with the saw as it cuts the material to be mitered.

Having now described my invention, what I claim as new and desire to secure by Letters Patent is:—

1. A miter box comprising a flat portion, vertical guides on said portion, a pair of horizontally parallel strips connected together and having their ends adapted to slide up and down said vertical guides and pins located on said flat portions, the pins on one side being so placed that a line touching the inner surfaces thereof is at right angles to a line touching the inner surfaces of the pins on the other side of said flat portion, substantially as described.

2. A miter box comprising a substantially diamond shaped body portion, vertical guides thereon arranged at opposite corners; a pair of parallel strips connected together and having their ends adapted to slide up and down said vertical guides, and pins located on said diamond shaped body portion, adjacent two meeting edges thereof, the pins on one edge being so arranged that a line touching the inner surfaces of said pins is at right angles to a line touching the inner surfaces of the pins on the other edge, substantially as described.

3. A miter box comprising a body portion, an upright vertical guide thereon, a downwardly extending vertical guide thereon opposite the other, a pair of parallel strips having one end adapted to slide up and down said upright vertical guide and connecting means for the other end of said strips slidable up and down on said downwardly extending guide substantially as and for the purposes set forth.

4. A miter box comprising a substantially diamond shaped body portion, an upright vertical guide at one corner thereof, a downwardly extending vertical guide at an opposite corner thereof, a pair of parallel strips having one end adapted to slide up and down said upright vertical guide and connecting means for the other end of said strips slidable up and down said downwardly extending guide substantially as and for the purposes set forth.

5. A miter box comprising a body portion, an upright vertical guide thereon, a downwardly extending vertical guide thereon opposite the other a pair of parallel strips having one end adapted to slide up and down said upright vertical guide, connecting means for the other end of said strips slidable up and down on said downwardly extending guide, and pins disposed at the ends of adjacent arms of said body so that the line touching the inner surfaces of the pins on one of said arms is at right angles to the line touching the inner surfaces of the pins on the other of said arms, substantially as and for the purposes set forth.

6. In a miter box a saw guide consisting of a vertical and a horizontal portion, horizontal strips adjustably secured to said horizontal portion, means for adjusting said saw guide vertically and means for securing same at a desired height substantially as and for the purposes set forth.

7. A miter box comprising a downward guide provided with a vertical rib at one side, a saw guide consisting of a slotted vertical and a slotted horizontal portion having horizontal strips adjustably secured to said horizontal portion the vertical portion of said saw guide being adapted to slide against said rib and means for securing said vertical portion at a desired height to said downward guide substantially as and for the purposes set forth.

8. A miter box comprising a downward guide provided with a vertical rib at one side, a saw guide consisting of a slotted vertical and a slotted horizontal portion having horizontal strips adjustably secured to said horizontal portion, the vertical portion of said saw guide being adapted to slide against said rib, a screw bolt secured to said downward guide passing through the slot in said vertical portion and a wing nut on said screw for securing said vertical portion to said downward guide substantially as and for the purposes set forth.

9. A miter box comprising a body portion, two upright guides thereon the one opposite the other, a pair of horizontal parallel strips connected together and having their ends adapted to slide up and down said upright guides and means for the lateral adjustment of said horizontal strips substantially as and for the purposes set forth.

10. A miter box comprising a body portion, two upright guides thereon, the one opposite the other, a pair of horizontal parallel strips having their opposing inner surfaces cut away and their ends adapted to slide up and down said upright guides, means for connecting said horizontal strips together and means for the lateral adjustment of said horizontal strips substantially as and for the purposes set forth.

11. A miter box comprising a body portion, a vertical guide way thereon, a saw guide sliding in said guide way, and consisting of a vertical and horizontal portion, and short horizontal strips adjustably secured to the horizontal portion of said saw guide.

12. In a miter box having horizontal strips sliding in vertical guides for holding the saw, adjusting screws at the side of such strips near the ends thereof and a passage in the side of the said vertical guides wherethrough said adjusting screw may be reached for adjustment substantially as described.

13. In a miter box saw guide having a horizontal portion and horizontal strips secured thereto, means for adjusting said horizontal strips laterally on said horizontal portion substantially as and for the purposes set forth.

In witness whereof I have hereunto set my hand in presence of two witnesses.

RALPH DUNNE.

Witnesses:
ANDREW JOHN PARK,
JOHN RUTHERFORD PARK.